Figure 5:
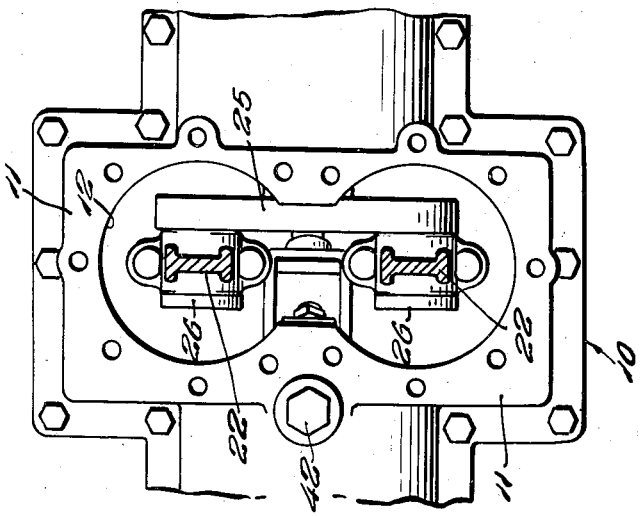

July 19, 1949.   W. S. FIELDS   2,476,716
POWER TRANSMISSION
Filed March 14, 1946   3 Sheets-Sheet 1
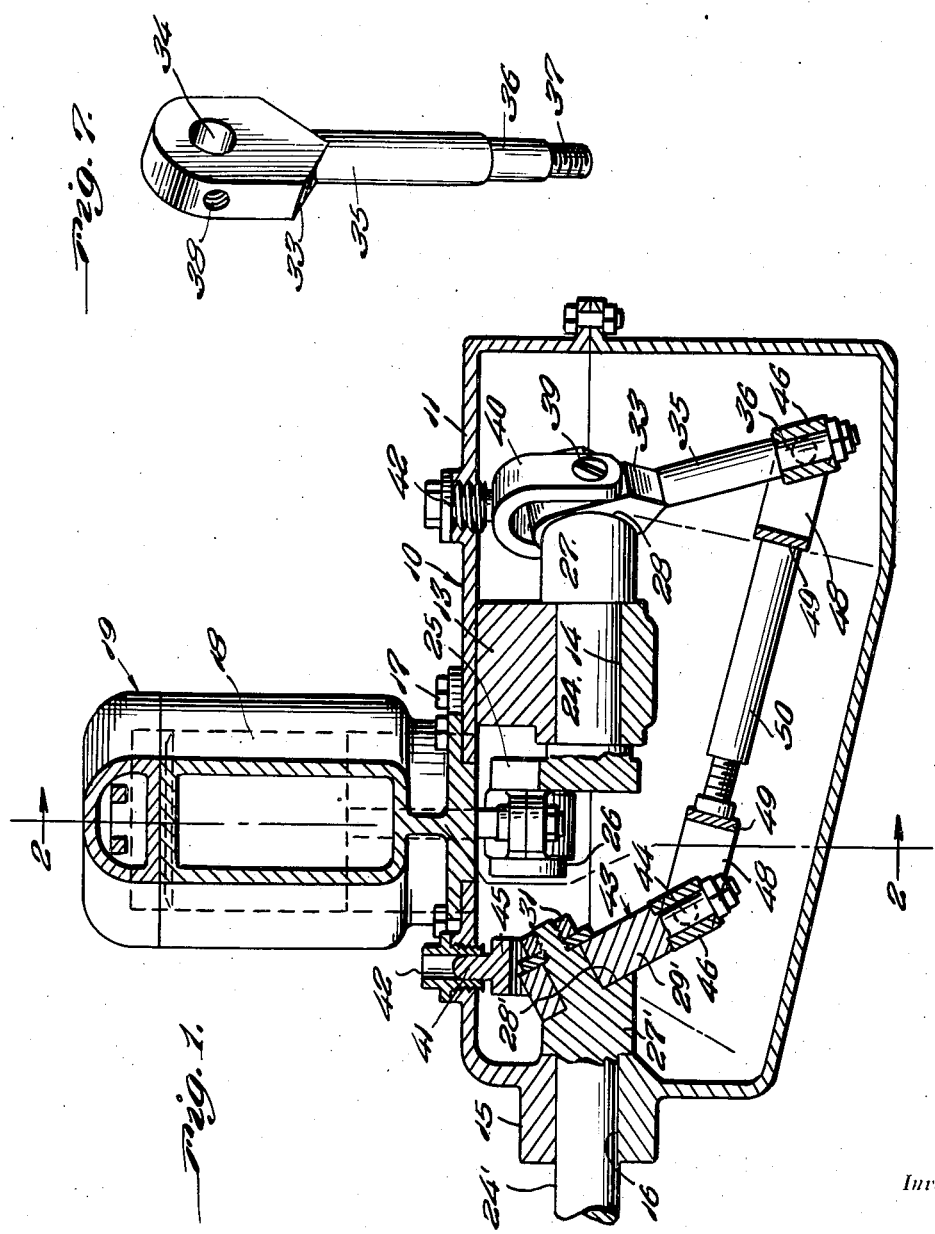
Inventor
Warren S. Fields
By Clarence A. O'Brien
and Harvey B. Jacobson
Attorneys July 19, 1949.  W. S. FIELDS  2,476,716
POWER TRANSMISSION
Filed March 14, 1946  3 Sheets-Sheet 2

Inventor
Warren S. Fields

By Clarence A. O'Brien
and Harvey B. Jacobson
Attorneys

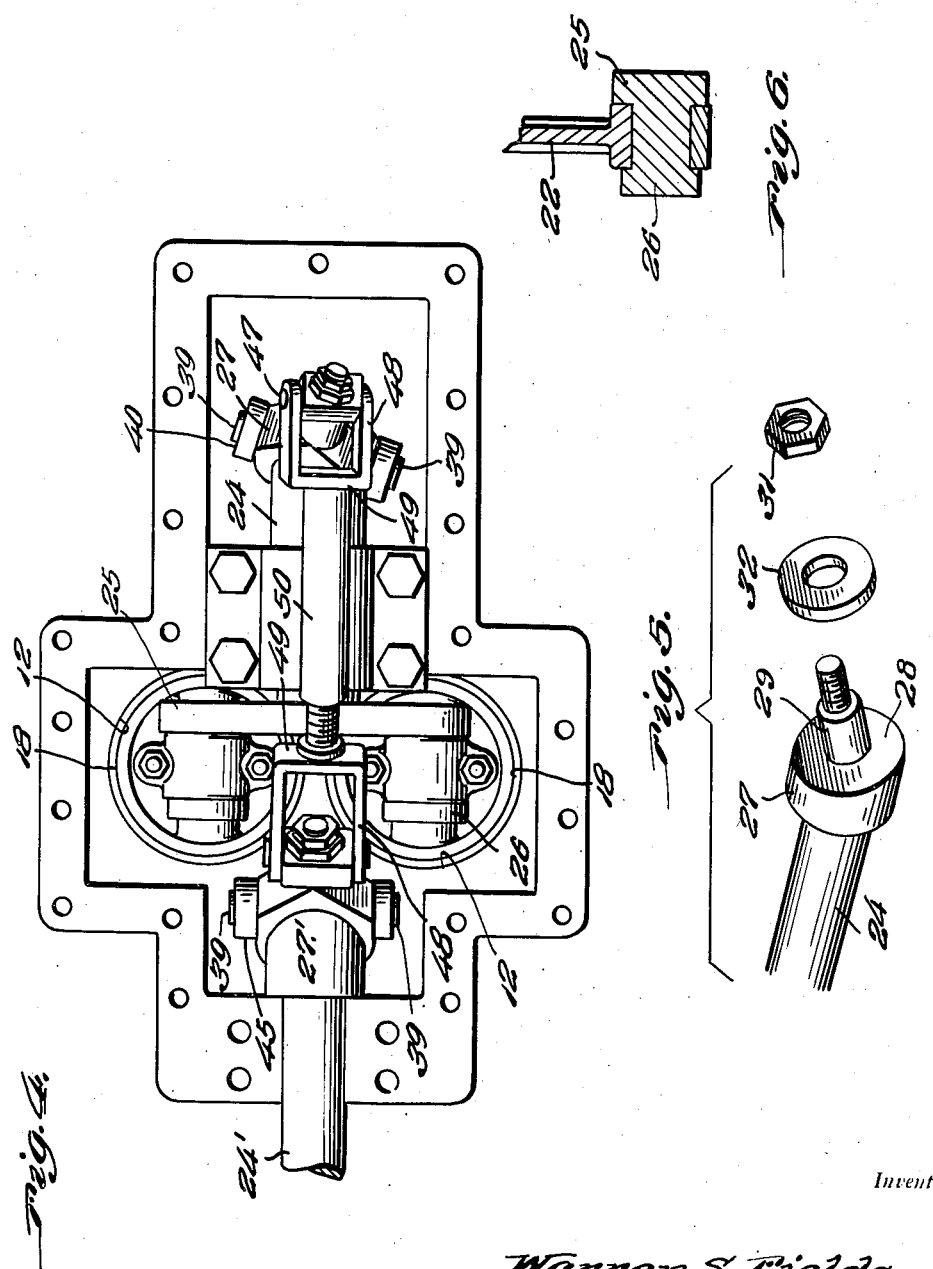

Patented July 19, 1949

2,476,716

UNITED STATES PATENT OFFICE 2,476,716

POWER TRANSMISSION

Warren S. Fields, Del Paso Heights, Calif.

Application March 14, 1946, Serial No. 654,254

4 Claims. (Cl. 74—60)

This invention relates to a power transmission and has for its primary object to translate rotary motion into oscillatory or reciprocating motion.

Another object is to effect economies in the operation of reciprocating engines and to increase the efficiency thereof.

The above and other objects may be attained by employing this invention which embodies among its features a rock shaft mounted to oscillate about a longitudinal axis, a power shaft mounted in spaced relation to the rock shaft to rotate about the same longitudinal axis, cams on the shafts, a cam rider on each cam and a link connecting the cam riders whereby when either of the shafts is moved about its axis the other shaft will be moved about its axis.

Other features include pistons, connected to the rock shaft, and means to hold the cam riders against rotation with their respective cams.

Figure 6:
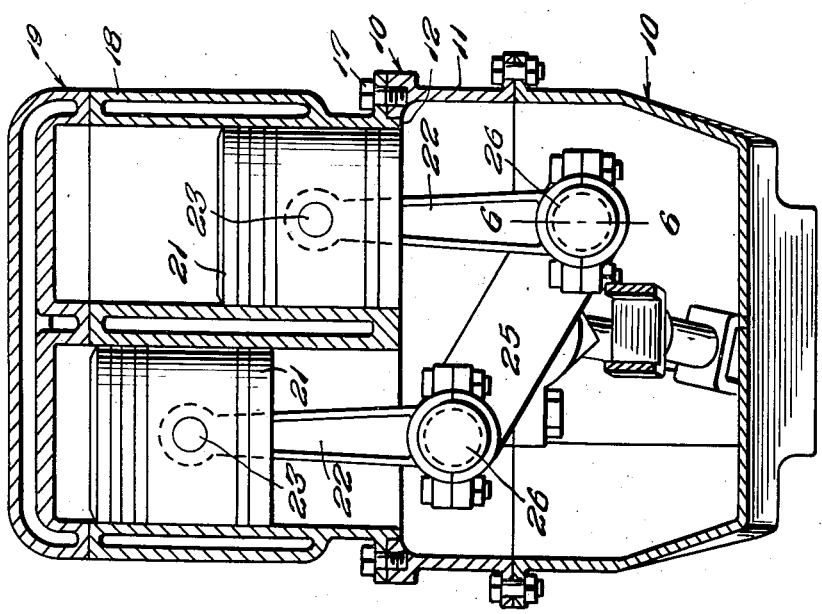

In the drawings:

Figure 1 is a longitudinal sectional view through a reciprocating engine equipped with this improved power transmission, Figure 2 is a transverse sectional view taken substantially along the line 2—2 of Figure 1, Figure 3 is a fragmentary plan view of the power transmission, showing the connecting rods of the pistons in section, Figure 4 is a bottom plan view of the upper portion of the case and the operating mechanism, Figure 5 is a fragmentary perspective exploded view of one of the shafts and its respective cam, Figure 6 is a fragmentary sectional view taken substantially along the line 6—6 of Figure 2 and Figure 7 is a perspective view of the cam rider employed on the rock shaft.

Referring to the drawings in detail my improved power transmission is designated generally 10 and is housed within a case 11 formed in its upper side with spaced openings 12 which are adapted to align the cylinders of the engine to be more fully hereinafter described. Depending from the cover of the case 11 adjacent the spaced openings 12 is a bearing bracket 13 having a bore 14 for the reception of the rock shaft to be more fully hereinafter described. Formed at one end of the case 11 is a boss 15 which is provided with an opening or bore 16 which aligns with the bore 14 and receives the power shaft to be more fully hereinafter described.

Attached as by bolts 17 to the upper side of the case 11 are cylinders 18 of a reciprocating engine designated generally 19 and slidably mounted in each cylinder 18 is a piston 21 in which one end of a connecting rod 22 is pivoted to swing about a wrist pin 23. Rotatably mounted in the bore 14 of the bearing bracket 13 is a rock shaft 24 carrying at one end a T-head 25 which is provided at opposite ends with outwardly extending bosses 26 forming crank pins to which the lower ends of the connecting rods 22 are pivoted. The end of the rock shaft 24 opposite that carrying the T-head 25 is provided with a collar 27 the end face 28 of which is cut at an angle and is provided with a boss 29 which forms a bearing for the cam rider which will be more fully hereinafter described. The boss 29 extends perpendicular with relation to the face 28 and is screw-threaded to receive a nut 31 by means of which a retaining washer 32 is held on the end of the boss 29 for the purpose of retaining the cam rider to be more fully hereinafter described in position thereon.

The cam rider above referred to is best illustrated in Figure 7 and comprises a head 33 having a transverse opening 34, and extending from the head 33 perpendicular to the axis of the opening 34 is a stem 35 carrying an axially projecting boss 36 which terminates at its free end in an externally screw-threaded portion 37. Formed in the head 33 diametrically opposite one another with relation to the opening 34 are internally screw-threaded openings 38 for the reception of trunnion screws 39 which form pivots or trunnions for entrance through oppositely disposed aligned openings in a yoke 40 which is pivotally mounted in a socket 41 formed in a plug 42 which enters the case 11 through its top wall.

Rotatably mounted in a bore 16 in the boss 15 is a power shaft 24' carrying at its inner end a collar 27' having a cam face 28' and a boss 29' which corresponds in every respect to the cam 27 previously described. A cam rider designated generally 43 which corresponds in every detail to the cam rider previously described with the exception of the length of the stem or shank 35 is mounted on the boss 29' and carries at its free end a boss 44 which corresponds to the boss 36. A swivelly mounted yoke 45 is likewise connected to the cam rider 43 in the same manner as the yoke 40 is connected to the cam rider previously described, as will be readily understood upon reference to Figure 1.

Carried on each boss 36 and 44 is a rotatable sleeve 46 carrying diametrically opposed outwardly extending trunnions 47 which are adapted to be pivotally mounted in arms 48 of a yoke 49. The yokes 49 are joined by an extensible link 50, so that when the cam rider first described is moved, the cam rider 43 will move in unison therewith.

In operation it will be understood that the pistons 21 are alternately reciprocated and the impulses therefor are transmitted through the connecting rods 22 to the T-head 25 as the shaft 24 oscillates. Such movement of the shaft 24 is caused by the cam rider on the cam 27 moving back and forth and thus imparting to and fro motion on the cam rider 43 through the medium of the link 50. Due to the fact that the shank 35 of the cam rider 33 is of greater length than the shank of the cam rider 43 it will be obvious that the stroke of the cam rider 43 will be such as to cause the shaft 24 to oscillate in its bore 14 while the shaft 24' rotates in its bore 16. In this way, the rotary motion of the shaft 24' will be translated to the oscillatory motion of the shaft 24 which will in turn impart reciprocating motion to the pistons.

I claim:

1. A power transmission for translating rotary motion into reciprocating motion which includes a rock shaft mounted to oscillate about a longitudinal axis, a rotating shaft mounted in spaced relation to the rock shaft to rotate about the same longitudinal axis, a cam on each shaft the face of which lies at an angle to the axis of the shaft, a cam rider on each cam adapted to ride on the face of each cam and a link connecting said cam riders whereby the oscillation of the first mentioned shaft occurs with the rotation of the last mentioned shaft.

2. A power transmission for translating rotary motion into reciprocating motion which includes a rock shaft mounted to oscillate about a longitudinal axis, a rotating shaft mounted in spaced relation to the rock shaft to rotate about the same longitudinal axis, a cam on each shaft the face of which lies at an angle to the axis of the shaft, a cam rider on each cam adapted to ride on the face of each cam and a link connecting said cam riders and the throw of the link by the cam riders being so regulated that when the last mentioned shaft rotates, the first mentioned shaft oscillates.

3. A power transmission for translating rotary motion into reciprocating motion which includes a rock shaft mounted to oscillate about a longitudinal axis, a rotating shaft mounted in spaced relation to the rock shaft to rotate about the same longitudinal axis, a cam on each shaft the face of which lies at an angle to the axis of the shaft, a cam rider on each cam adapted to ride on the face of each cam and a link connecting said cam riders whereby the oscillation of the first mentioned shaft occurs with the rotation of the last mentioned shaft, and means to hold the cam riders against rotation with the cams.

4. A power transmission for translating rotary motion into reciprocating motion which includes a rock shaft mounted to oscillate about a longitudinal axis, a power shaft mounted in spaced relation to the rock shaft to rotate about the same longitudinal axis, a cam on each shaft the face of which lies at an angle to the axis of the shaft, a cam rider on each cam adapted to ride on the face of each cam and a link connecting said cam riders and the throw of the link by the cam riders being so regulated that when the last mentioned shaft rotates the first mentioned shaft oscillates, and means to hold the cam riders against rotation with the cams.

WARREN S. FIELDS.

No references cited.